United States Patent [19]
Köpf

[11] 3,980,314
[45] Sept. 14, 1976

[54] SAFETY STEERING FOR MOTOR VEHICLES

[75] Inventor: Wolfgang Köpf, Stuttgart, Germany

[73] Assignee: Daimler-Benz Aktiengesellschaft, Germany

[22] Filed: Dec. 18, 1974

[21] Appl. No.: 534,161

[30] Foreign Application Priority Data
Dec. 21, 1973   Germany............................ 2363895

[52] U.S. Cl.............................. 280/87 C; 74/492; 188/1 C
[51] Int. Cl.².......................................... B62D 1/18
[58] Field of Search.......... 280/87 R, 87 A; 180/78; 188/1 C; 74/492, 493

[56] References Cited
UNITED STATES PATENTS

| 3,482,653 | 12/1969 | Maki et al............................ | 188/1 C |
| 3,508,633 | 4/1970 | Nishimura et al. ............... | 74/493 X |
| 3,600,970 | 8/1971 | Loofbourrow....................... | 188/1 C |
| 3,805,636 | 4/1974 | Howes ................................ | 74/492 |
| 3,806,191 | 4/1974 | Stegmaier .......................... | 188/1 C |
| 3,864,988 | 2/1975 | Adams.................................. | 74/492 |

*Primary Examiner*—Kenneth H. Betts
*Attorney, Agent, or Firm*—Craig & Antonelli

[57] ABSTRACT

A safety steering system for motor vehicles with a steering spindle which is concentrically surrounded over a part of its length by a plastically deformable deformation member and which is changeable in its length by an impact of the driver against the steering wheel caused by an accident; the end of the deformaton member remote from the steering wheel is thereby supported at a fixed vehicle part arranged at a distance to the end wall while an outer column which is arranged between the deformation member and the steering spindle within the area of the deformation member, is displaceable in case of an accident together with the steering wheel and with the adjoining part of the steering spindle; the deformation member is thereby constituted by one or several hollow bodies which have an inner diameter that is only slightly larger than the outer diameter of the outer column.

7 Claims, 6 Drawing Figures

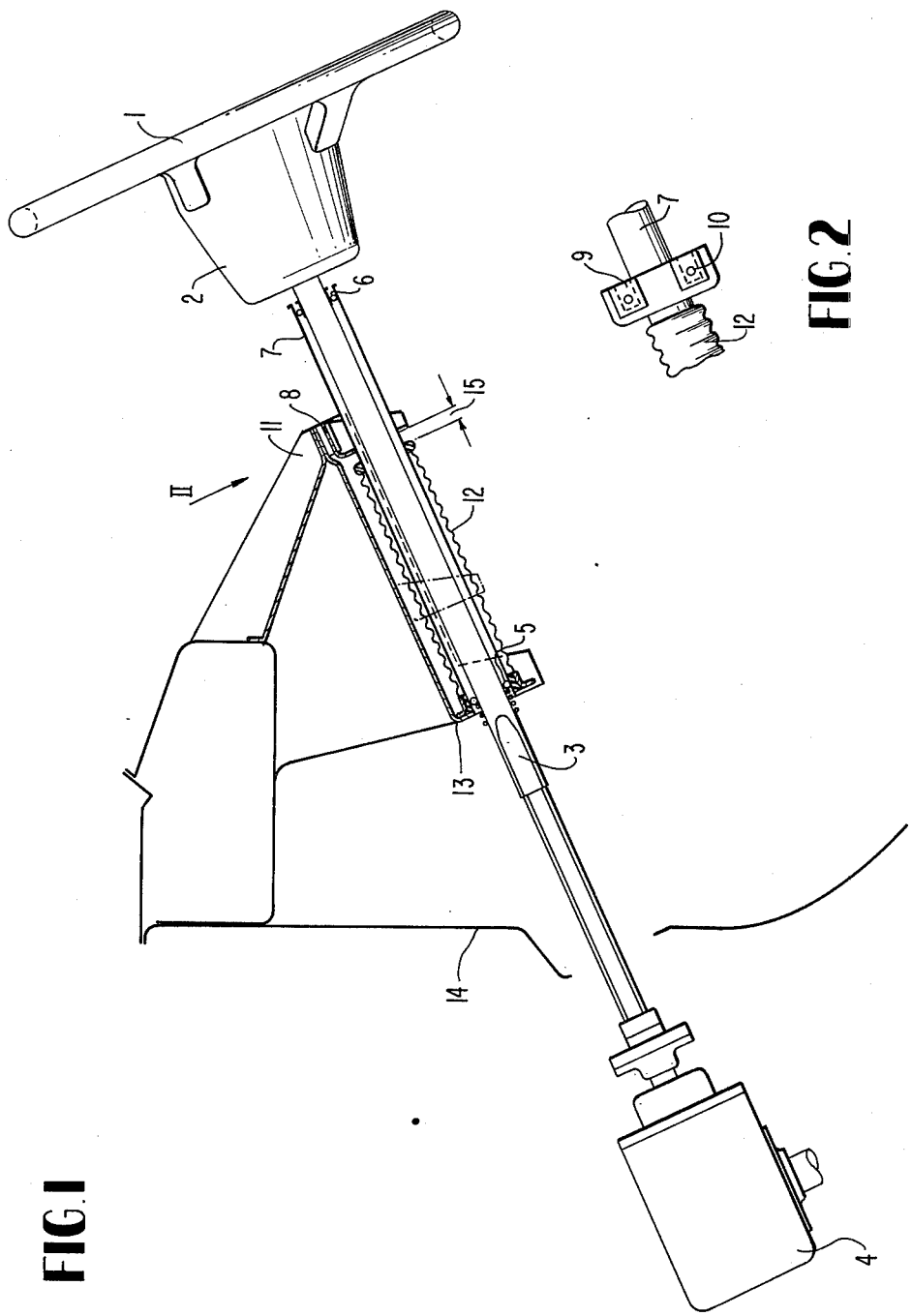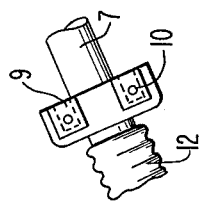

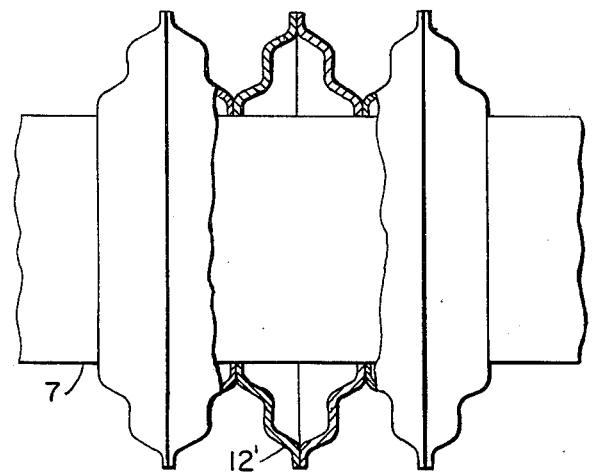
FIG. 3
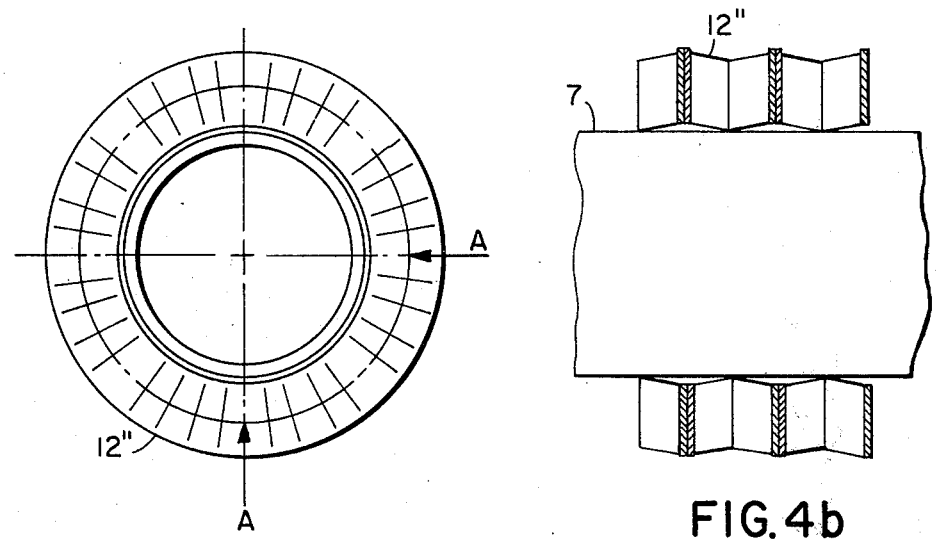
FIG. 4a
FIG. 4b
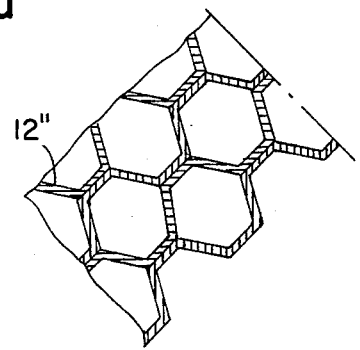
FIG. 4c

SAFETY STEERING FOR MOTOR VEHICLES

The present invention relates to a safety steering system for motor vehicles with a steering spindle which is concentrically surrounded over a part of its length by a plastically deformable deformation member and which is changeable in its length by an impact of the driver against the steering wheel, which results during an accident.

The present invention is concerned with the task to so further develop a steering system of this type that both a completely satisfactory bearing support of the steering spindle as well as also a completely satisfactory deformation of the deformation member is assured during an accident without lateral buckling connected with force peaks.

This is attained according to the present invention in that the end of the deformation member remote from the steering wheel is supported in a conventional manner at a fixed vehicle part arranged at a distance to the end wall of the passenger space, and in that within the area of the deformation member an outer column, known as such, is arranged between this deformation member and the steering spindle which, in case of an accident, is displaceable together with the steering wheel and with the adjoining part of the steering spindle, and in that the deformation member is formed by one or several hollow bodies which have an internal diameter that is only slightly larger than the outer diameter of the outer column.

The deformation member may thereby be constructed advantageously as corrugated or undulated tubular member or may also be constituted by dish-shaped or plate-shaped sheet metal members arranged facing each other pair-wise.

Accordingly, it is an object of the present invention to provide a safety steering for motor vehicles which avoids by simple means the aforementioned shortcomings and drawbacks encountered in the prior art.

Another object of the present invention resides in a safety steering system for motor vehicles which assures a completely satisfactory bearing support of the steering spindle.

A further object of the present invention resides in a safety steering system for motor vehicles which ensures a completely satisfactory deformation of the safety deformation member without lateral buckling possibly entailing momentary peak forces.

A still further object of the present invention resides in a safety steering for motor vehicles which is simple in construction, reliable in operation and which increases the safety of the driver.

These and other objects, features and advantages of the present invention will become more apparent from the following description when taken in connection with the accompanying drawing which shows, for purposes of illustration only, one embodiment in accordance with the present invention and wherein:

FIG. 1 is a side elevational view of a safety steering system in accordance with the present invention, partly in cross section.

FIG. 2 is an elevational view, taken in the direction of arrow II in FIG. 1.

FIG. 3 is a partial cross-sectional view of a feature of the safety steering system in accordance with the present invention.

FIGS. 4a, 4b and 4c are partial cross-sectional views of a further arrangement of the present invention.

Referring now to the drawing wherein like reference numerals are used throughout the two views to designate like parts, the safety steering system illustrated in the drawing includes a steering wheel 1 with a so-called impact pot 2 and a two-partite steering spindle 3 adjoining the same, which establishes the connection with the steering gear 4. The steering spindle 3 is supported by means of two bearings 5 and 6 within an outer column 7 which extends only over a part of the length of the steering spindle 3 and which, in its turn, is retained at a relatively fixed vehicle part 11 by way of a guide strap, bracket or collar 8 provided with an elongated-aperture guidance 9 by means of pins or bolts 10 adapted to be sheared off. A corrugated or undulated tubular member 12 forming a plastically deformable deformation member is mounted over the outer column 7 within the area between this fastening of the outer column 7 and the end area thereof remote from the steering wheel; the inner diameter of the corrugated tubular member 12 is only slightly larger than the outer diameter of the outer column 7. The end of the corrugated tubular member 12 remote from the steering wheel is supported at a relatively fixed vehicle part 13 which is arranged at a distance from the end wall 14 so that deformations of the end wall 14 which may occur in case of an accident, cannot affect the corrugated tubular member 12. Plastically deformable deformation members, which are useful in the present invention, may also be dish-shaped or plate-shaped, sheet metal members, such as 12' in FIG. 3, arranged facing each other pair wise. Further, a plurality of hollow bodies, such as 12'' in FIGS. 4(a–c) may be utilized for the plastically deformable deformation member, wherein FIG. 4c is a view in the direction of the arrows A—A in FIG. 4a.

OPERATION

The operation of the safety steering system according to the present invention is such that during an impact of the driver onto the steering wheel 1, at first the deformation path of the impact pot 2 adjoining the same is used up. If sufficient impact energy is not absorbed thereby, the connection 9, 10 of the outer column 7 with the fixed vehicle part 11 is released and the steering spindle 3 is displaced by virtue of the two-partite construction together with the outer column 7 in the direction away from the driver. The bar, strap or collar 8 rigidly connected with the outer column 7 thereby runs up against the end of the corrugated tubular member 12 and compresses the same whereby the outer column 7 serves as guidance against a lateral deflection or buckling of the corrugated tubular member 12 during the deformation. It is achieved by the distance 15 between the bar 8 and the upper end of the corrugated tubular member 12, normally provided in the installed condition, that at first the force necessary for the disengagement of the connection of the bar 8 with the fixed vehicle part 11 is used up or absorbed without the fact that simultaneously already the deformation of the corrugated tubular member 12 starts, which would have led to an undesired force peak.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. In a safety steering of the type including a steering wheel, a steering spindle means being displaceable during an accident, a hollow column means surrounding said steering spindle means and being displaceable therewith during an accident, and a plastically deformable deformation means concentrically surrounding at least a portion of both said column means and said steering spindle means, said deformation means being changeable in length during an accident, wherein said deformation means includes at least one hollow body having an inner diameter only slightly larger than the outer diameter of said column means, the improvement comprising holding means for supporting said column means, said holding means including a movable member being spaced at a predetermined dimension from a first end of said deformation means facing said steering wheel such that said movable member pushes against said first end upon impact of a driver on said steering wheel during an accident, and said deformation means having a second end facing away from said steering wheel and being supported at a fixed vehicle part separated at a second predetermined distance from the end wall of a vehicle passenger compartment to prevent impact forces of said end wall from effecting said deformation means.

2. A safety steering according to claim 1, characterized in that the deformation means is constituted by a single hollow body.

3. A safety steering according to claim 1, characterized in that the deformation means is constituted by several hollow bodies.

4. A safety steering according to claim 1, characterized in that the deformation means is constructed as corrugated tubular member.

5. A safety steering according to claim 4, characterized in that the deformation means is constituted by a single hollow body.

6. A safety steering according to claim 1, characterized in that the deformation means is being constituted by dish-shaped sheet metal members which are arranged respectively facing one another pairwise.

7. A safety steering according to claim 6, characterized in that the deformation means is constituted by several hollow bodies.

* * * * *